June 21, 1932.   C. T. PFLUEGER   1,864,146
FISHING REEL
Filed April 9, 1928
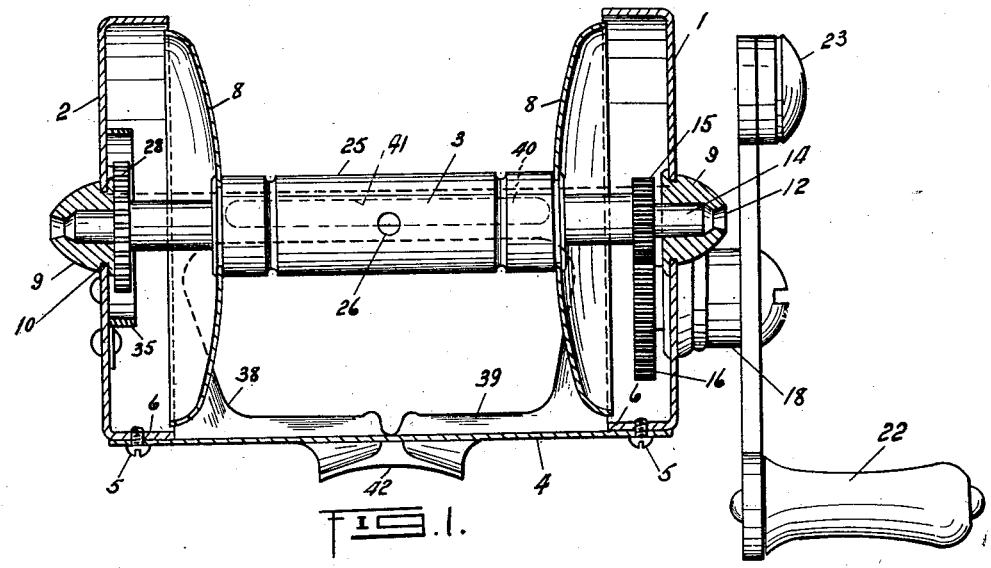
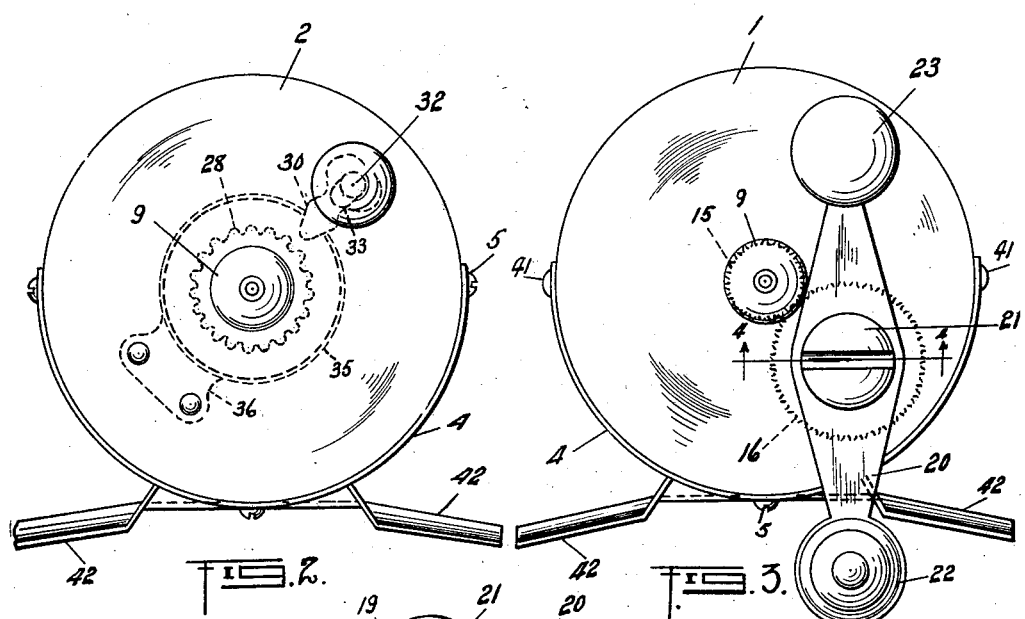
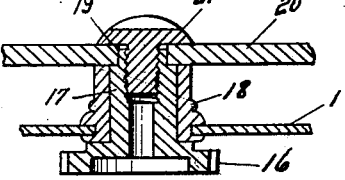
INVENTOR.
Charles T. Pflueger.
BY Ely & Barrow
ATTORNEYS.

Patented June 21, 1932

1,864,146

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHING REEL

Application filed April 9, 1928. Serial No. 268,626.

The present invention relates to fishing reels and particularly to reels of the multiplying type in which the spool is driven through multiplying gearing. The reel is also provided with a click mechanism, the entire structure being made from a very few parts so that the structure can be manufactured economically and can be sold at a low price for this type of reel. The reel is made of a minimum number of parts and is assembled with a few screws so that it can be easily taken apart for cleaning and oiling.

The invention consists in the design and arrangement of parts whereby the above stated and other objects may be secured, it being understood that, having explained the features of the invention, changes and modifications may be made therein within the scope of the invention as set forth in the appended claims.

In the drawing,

Figure 1 is a longitudinal section through the complete reel structure;

Figure 2 is an elevation of the reel looking at the back plate;

Figure 3 is a similar view looking at the front plate; and

Figure 4 is a section on the line 4—4 of Figure 3.

The reel shown herein consists of four main parts, two end plates, the front plate 1 and the back plate 2, the spool 3 and the combined reel cage or frame and reel seat 4. These parts are readily separable to obtain access to the interior of the reel structure, the reel cage or frame being secured by screws 5 to inwardly directed flanges 6 formed about the end plates 1 and 2 these flanges extending to and overlapping the spool flanges 8 when the reel is assembled.

Each end plate is provided with a centrally located bearing 9 having a reduced shank 10 seated in an aperture in the end plate, the metal of the sleeve at the interior of the plate being spun or peened over to secure the bearing in position. Each bearing is provided with a central oil hole 12 for lubricating the spool shaft 14, which is reduced at its outer ends to seat in the bearing. On the reduced end of the spool shaft within the front plate is fixed the drive pinion 15, which meshes with a larger drive gear 16.

The drive gear 16 is combined with a post 17 which is rotatably mounted in a sleeve 18 fixed to the front plate, the upper end of the post being squared as at 19 to form a non-rotative seat for the operating crank 20, which is secured in place by a screw 21 entering a socket in the post 17. The crank carries the usual operating handle 22 at one end and the balance block 23 at the other end.

The spool is provided with an enlarged barrel 25 having a central opening 26 for securing the line. The spool flanges seat against the end of the barrel, being held in position by burnishing, or other methods.

The spool shaft is provided within the rear plate 2 with the click pinion 28, with which is arranged to cooperate the click pawl 30 which is of any usual or standard form, being rotatably mounted on a sliding button 32 in a radial slot 33 in the rear plate, so as to be movable into and out of engagement with the click pinion. The curved spring 35 surrounds the click pinion, being secured to the end plate by the integral web 36. The ends of the spring bear against the head of the click pawl as shown in Figure 2.

The combined frame and reel seat 4 is made from a single piece of metal and stamped into substantially semi-circular shape so as to form a cradle or seat for the reception of the two end plates, the screws 5 being passed through the edges of the frame into the flanges of the end plate. The frame is formed with cut out portions 38 leaving a broad central web 39 at the base of the reel and cross bars 40 at the extremities of the frame, the parts 39 and 40 bracing the end plates and affording a strong frame work for the reel. The cross bars may be provided with stamped up ribs 41 for strengthening purposes, these ribs being shown in dotted outline in Figure 1 and in side elevation in Figure 3, where the screws 5 are omitted from the drawing. A portion of the metal removed at 38 on either side of the central web is bent downwardly to form the reel seats 42.

It will be seen that a complete operative reel of the type specified has been obtained with a minimum number of parts. The structure is easily taken apart and is strong and efficient for the purpose. The reel may be made economically and will fill the demand for a low-priced reel of this type.

What is claimed is:

1. In a fishing reel, a frame made from a single piece of metal curved to form a cradle, and end plates having inturned flanges secured by the flanges to the ends of the cradle, said cradle having a central longitudinal member, transversely projecting reel seats at the sides of said member, and bars located on opposite sides of the reel, the portion of the frame between the longitudinal member and the bars being cut away so that the frame presents relatively large openings whereby the reel can be more easily reached by hand and air.

2. In a fishing reel, the combination of a one-piece cradle-like frame of pressed metal comprising a central longitudinally extending member forming the bottom of the cradle, transversely projecting reel seats midway of and integral with said central member, bars forming the sides of the cradle, said bars being parallel with the central member, the ends and top of the cradle being left open.

3. In a fishing reel, the combination of a one-piece cradle-like frame comprising a central longitudinally extending member forming the bottom of the cradle, transversely projecting reel seats midway of and integral with said central member, bars forming the sides of the cradle and spool supporting end plates, having integral inturned flanges, said end plates closing the ends of the cradle and being connected thereto by said flanges.

CHARLES T. PFLUEGER.